United States Patent
Choi et al.

(10) Patent No.: US 10,192,459 B2
(45) Date of Patent: Jan. 29, 2019

(54) SERVER, INFORMATION PROVIDING METHOD OF SERVER, DISPLAY APPARATUS, CONTROLLING METHOD OF DISPLAY APPARATUS AND INFORMATION PROVIDING SYSTEM

(71) Applicant: SAMSUNG ELECTRONICS CO., LTD., Suwon-si (KR)

(72) Inventors: Dong-hyun Choi, Suwon-si (KR); Seung-won Kim, Gwangju-si (KR); Je-youn Dong, Suwon-si (KR); Yong-wook Shin, Hwaseong-si (KR); Yong-hoon Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 602 days.

(21) Appl. No.: 14/799,083

(22) Filed: Jul. 14, 2015

(65) Prior Publication Data
US 2016/0035234 A1 Feb. 4, 2016

(30) Foreign Application Priority Data
Jul. 29, 2014 (KR) ........................ 10-2014-0096739

(51) Int. Cl.
G09B 7/00 (2006.01)
G09B 5/02 (2006.01)

(52) U.S. Cl.
CPC ................. *G09B 7/00* (2013.01); *G09B 5/02* (2013.01)

(58) Field of Classification Search
CPC ... G09B 7/00; G09B 5/02; G06N 5/02; G06N 5/04; G06N 5/022; H04N 21/274; H04N 21/472; H04N 21/25; G06F 17/30; G06F 17/30675; G06F 17/30424
USPC ........................................... 706/46
See application file for complete search history.

(56) References Cited

U.S. PATENT DOCUMENTS

| 6,028,601 A | 2/2000 | Machiraju et al. |
| 8,180,789 B1 | 5/2012 | Wasserman et al. |
| 2002/0162117 A1* | 10/2002 | Pearson ................ H04N 5/445 725/109 |

(Continued)

FOREIGN PATENT DOCUMENTS

| KR | 10-2004-0031026 A | 4/2004 |
| KR | 10-2011-0017760 A | 2/2011 |
| KR | 10-2013-0076346 A | 7/2013 |

OTHER PUBLICATIONS

Communication dated Nov. 23, 2015 issued by the International Searching Authority in counterpart International Application No. PCT/KR2015/007616 (PCT/ISA/210/237).

(Continued)

*Primary Examiner* — Dave Misir
(74) *Attorney, Agent, or Firm* — Sughrue Mion, PLLC

(57) ABSTRACT

An information providing method of a server, including: acquiring at least one of content information corresponding to content displayed on a display apparatus and user information of a user of the display apparatus; extracting at least one question related to the content from a question-answer database based on the at least one of the content information and the user information; and transmitting the extracted at least one question to the display apparatus, wherein the question-answer database is generated based on a question-answer template.

13 Claims, 14 Drawing Sheets

(56) References Cited

U.S. PATENT DOCUMENTS

| | | | |
|---|---|---|---|
| 2003/0061196 A1* | 3/2003 | Hirasawa | G06F 17/30899 |
| 2005/0076055 A1 | 4/2005 | Mory et al. | |
| 2007/0050374 A1 | 3/2007 | Zhao et al. | |
| 2007/0156662 A1* | 7/2007 | Tully | G06F 17/30595 |
| 2008/0104065 A1 | 5/2008 | Agarwal et al. | |
| 2008/0201315 A1 | 8/2008 | Lazier et al. | |
| 2009/0287678 A1 | 11/2009 | Brown et al. | |
| 2010/0081120 A1 | 4/2010 | Nanjiani et al. | |
| 2010/0199294 A1* | 8/2010 | Choi | H04N 7/17318 725/13 |
| 2011/0125734 A1 | 5/2011 | Duboue et al. | |
| 2012/0167153 A1* | 6/2012 | Ryu | H04N 21/254 725/109 |
| 2012/0214147 A1* | 8/2012 | Ernst | G09B 7/00 434/353 |
| 2013/0035086 A1* | 2/2013 | Chardon | H04N 21/00 455/420 |
| 2013/0117280 A1* | 5/2013 | Donaldson | G06F 17/30129 707/748 |
| 2013/0325897 A1* | 12/2013 | Motgi | G06F 17/30699 707/776 |
| 2014/0068665 A1* | 3/2014 | Evans | H04N 21/4781 725/37 |
| 2014/0080110 A1* | 3/2014 | Nguyen | G09B 7/00 434/362 |
| 2014/0122528 A1* | 5/2014 | Yamagishi | G06F 17/30979 707/770 |

OTHER PUBLICATIONS

Communication dated Dec. 19, 2017, from the European Patent Office in counterpart European Application No. 15826763.3.
Communication dated Jun. 27, 2018, issued by the European Patent Office in counterpart European Patent Application No. 15826763.3.

* cited by examiner

FIG. 4A

Q: Who's the director of the movie 'XXXX'?
A: It's aaa.
Q: Do you want to know the other movies of the director aaa?
A: They are YY and ZZZ.
Q: Do you want to know the main cast of YY?
A: They are bbb, ccc, and ddd.

FIG. 5

Q: What is considered most important by the director kkk in selecting cast?
A: In selecting cast, Director kkk says, "The appearances of cast members have been considered. A correct look is one of the most important things. However, there are many actors who look the part may not be seasoned enough actors."

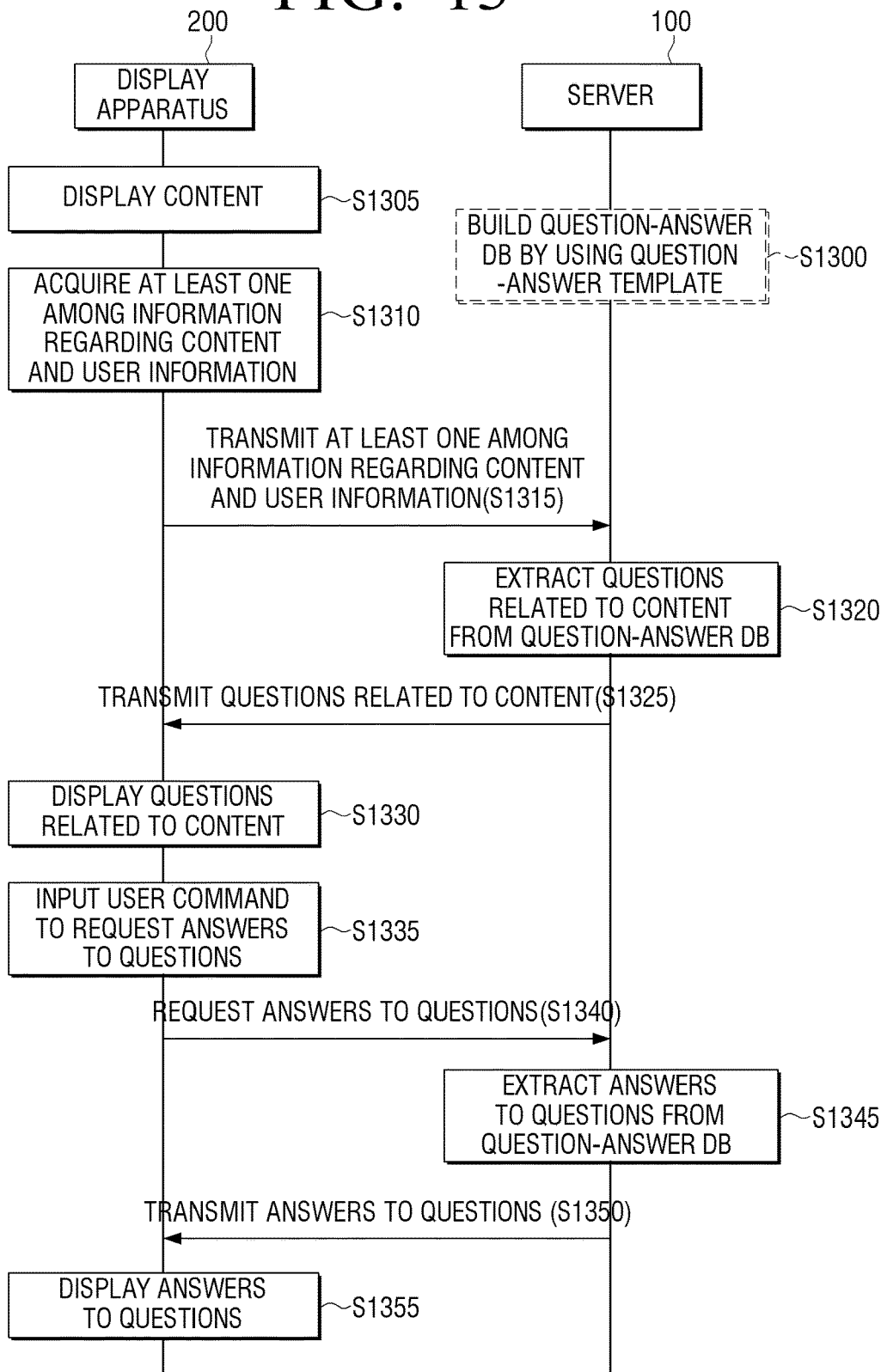

SERVER, INFORMATION PROVIDING METHOD OF SERVER, DISPLAY APPARATUS, CONTROLLING METHOD OF DISPLAY APPARATUS AND INFORMATION PROVIDING SYSTEM

CROSS-REFERENCE TO RELATED APPLICATIONS

This application claims priority from Korean Patent Application No. 10-2014-0096739, filed on Jul. 29, 2014 in the Korean Intellectual Property Office, the disclosure of which is incorporated herein by reference in its entirety.

BACKGROUND

1. Field

Servers, methods, apparatuses and systems consistent with one or more aspects of one or more exemplary embodiments relate to a server, an information providing method of the server, a display apparatus, a controlling method of the display apparatus, and an information providing system, and more specifically, to a server configured to provide information related to content in a question-answer format, an information providing method of the server, a display apparatus, a controlling method of the display apparatus, and an information providing system.

2. Description of the Related Art

Strengthened with the development of the electronic technology, various types of display apparatuses have been developed and are equipped with various functions. Various display apparatuses including televisions (TVs) provide various services, while being connected to various servers through networks such as the Internet.

Specifically, a user of the display apparatus may want to confirm information related to content which is currently displayed by the display apparatus. For example, when a user views a movie, a user may want to know the director of the corresponding movie or the other movies produced by the director.

In the related technology, a user must search for and acquire in person the information to be confirmed with another electronic apparatus or TV which is connected to the Internet.

Accordingly, there is a need for a new technology that can provide information related to the content that may be asked by a user, while minimizing the interruption in viewing the content, which can enrich the content viewing experience of a user.

SUMMARY

One or more exemplary embodiments overcome the above disadvantages and other disadvantages not described above. Also, one or more exemplary embodiments are not required to overcome the disadvantages described above, and an exemplary embodiment may not overcome any of the problems described above.

According to an aspect of an exemplary embodiment, there is provided a server configured to provide information related to content in a question-answer format while minimizing the interruption in viewing the content by a user, which can enrich the content viewing experience of a user, an information providing method of the server, a display apparatus, a controlling method of the display apparatus, and an information providing system.

According to an aspect of an exemplary embodiment, there is provided an information providing method of a server including: acquiring at least one of content information corresponding to content displayed on a display apparatus and user information of a user of the display apparatus; extracting at least one question related to the content from a question-answer database based on the at least one of the content information and the user information; and transmitting the extracted at least one question to the display apparatus, wherein the question-answer database is generated based on a question-answer template.

The information providing method may further include: receiving a request for at least one answer to the at least one question from the display apparatus; extracting the at least one answer from the question-answer database; and transmitting the extracted at least one answer to the display apparatus.

The question-answer template may be generated by acquiring seed questions and seed answers, extracting a plurality of keywords from the seed questions and the seed answers, and analyzing relationships between the plurality of extracted keywords.

The question-answer database may include at least one question-answer set including an answer generated based on documents acquired from external web pages and a question generated to correspond to the generated answer.

The question-answer database may include a plurality of the question-answer sets having a hierarchical tree-based structure.

The content information may include at least one of keywords related to the content and information corresponding to a display state of the content.

The user information may include at least one of preference information of the user and use history information.

The extracting at least one question may include: selecting a path in the hierarchical tree-based structure of the plurality of the question-answer sets by using at least one of the content information and the user information, and extracting at least one question corresponding to the question-answer sets of the selected path.

According to an aspect of an exemplary embodiment, there is provided a server including: a communicator configured to communicate with an external device; a question-answer database configured to store question-answer sets, the question-answer sets being generated based on a question-answer template; and a controller configured to, in response to at least one of content information corresponding to content displayed on a display apparatus and user information of a user of the display apparatus being acquired through the communicator, extract at least one question related to the content displayed on the display apparatus from the question-answer database based on the at least one of the content information and the user information, and to control the communicator to transmit the extracted at least one question to the display apparatus.

The controller may be further configured to, in response to a request for at least one answer to the at least one question being received from the display apparatus, extract the at least one answer from the question-answer database and control the communicator to transmit the at least one answer to the display apparatus.

The question-answer template may be generated by acquiring seed questions and seed answers, extracting a plurality of keywords from the seed questions and the seed answers, and analyzing relationships between the plurality of the extracted keywords.

The question-answer database may include at least one of the question-answer set including an answer generated based on documents acquired from external web pages and a question generated to correspond to the generated answer.

The question-answer database may include a plurality of the question-answer sets having a hierarchical tree-based structure.

The content information may include at least one of keywords corresponding to the content and information corresponding to a display state of the content.

The user information may include at least one of preference information of the user and use history information.

The controller may be further configured to select a path in the hierarchical tree-based structure of the plurality of the question-answer sets by using at least one of the content information and the user information, and to extract the at least one question corresponding to the question-answer sets of the selected path.

According to an aspect of an exemplary embodiment, there is provided a controlling method of a display apparatus including: displaying content; acquiring at least one of content information corresponding to the displayed content and user information; acquiring at least one question related to the content based on at least one of the content information and the user information; displaying the acquired at least one question; acquiring, in response to receiving a user command to request at least one answer to the acquired at least one question, the at least one answer; and displaying the acquired at least one answer.

The acquiring the at least one question may include: transmitting at least one of the content information and the user information to a server, the server including a question-answer database generated using a question-answer template; and acquiring the at least one question related to the content from the server.

The acquiring the at least one answer may include: transmitting, in response to receiving the user command to request the at least one answer to the acquired at least one question, a request for the at least one answer to the acquired at least one question to the server; and acquiring the at least one answer corresponding to the at least one acquired question from the server.

According to an aspect of an exemplary embodiment, there is provided a display apparatus including: a display configured to display content; an receiver configured to receive a user command; and a controller configured to acquire at least one of content information corresponding to the displayed content and user information, acquire at least one question related to the content based on at least one of the acquired content information and the acquired user information, control the display to display the acquired at least one question, acquire, in response to the receiver receiving a user command to request at least one answer to the acquired at least one question, the at least one answer, and control the display to display the acquired at least one answer.

The display apparatus may further include: a communicator configured to communicate with a server, the server including a question-answer database generated using a question-answer template.

The controller may be further configured to control the communicator to: transmit at least one of the acquired content information and the acquired user information to the server; acquire the at least one question related to the content from the server; transmit, in response to the receiver receiving the user command to request at least one answer to the acquired at least one question, the request for the at least one answer to the acquired at least one question to the server; and acquire the at least one answer corresponding to the acquired at least one question from the server.

According to an aspect of an exemplary embodiment, there is provided an information providing system including: a display apparatus configured to display content; and a server including a question-answer database generated using a question-answer template, the server being configured to, in response to at least one of information corresponding to the content displayed on the display apparatus and user information of a user of the display apparatus being acquired, extract question-answer sets related to the content from the question-answer database based on the acquired at least one of content information and user information, and transmit the extracted question-answer sets to the display apparatus, wherein the display apparatus is further configured to acquire the at least one of the content information and user information, transmit the at least one of the content information and the user information to the server, and display the question-answer sets related to the content acquired from the server.

According to an aspect of an exemplary embodiment, there is provided a method of generating a question-answer database, the method including: building a knowledge base corresponding to a primary content; extracting a plurality of keywords from seed questions and seed answers using a question-answer template; generating a plurality of template question-answer sets by analyzing relationships between the plurality of extracted keywords; and storing the generated plurality of template question-answer sets in a database in a tree-based hierarchical structure.

The building the knowledge base may include: acquiring metadata corresponding to content related to the primary content; and organizing the metadata in a table format.

The method may further include: acquiring at least one document from at least one external source; selecting information contained in the acquired at least one document; generating at least one answer corresponding to the selected information; generating at least one question corresponding to the generated at least one answer; generating at least one non-template question-answer set based on the generated at least one answer and the corresponding generated at least one question; and storing the generated at least one non-template question-answer set in the database in the tree-based hierarchical structure with the plurality of template question-answer sets.

According to one or more exemplary embodiments, the information related to the content may be provided while minimizing the interruption in viewing the content by a user. Therefore, the content viewing experience of a user can be enriched.

BRIEF DESCRIPTION OF THE DRAWINGS

The above and/or other aspects of one or more exemplary embodiments will be more apparent by describing certain exemplary embodiments with reference to the accompanying drawings, in which:

FIGS. 4A and 4B illustrates seed questions and seed answers and corresponding question-answer templates according to an exemplary embodiment;

FIG. 5 illustrates a question-answer set generated based on documents according to an exemplary embodiment;

FIG. 13 is a timing diagram of an operation of a server and a display apparatus according to an exemplary embodiment.

DETAILED DESCRIPTION OF EXEMPLARY EMBODIMENTS

Figure 1:
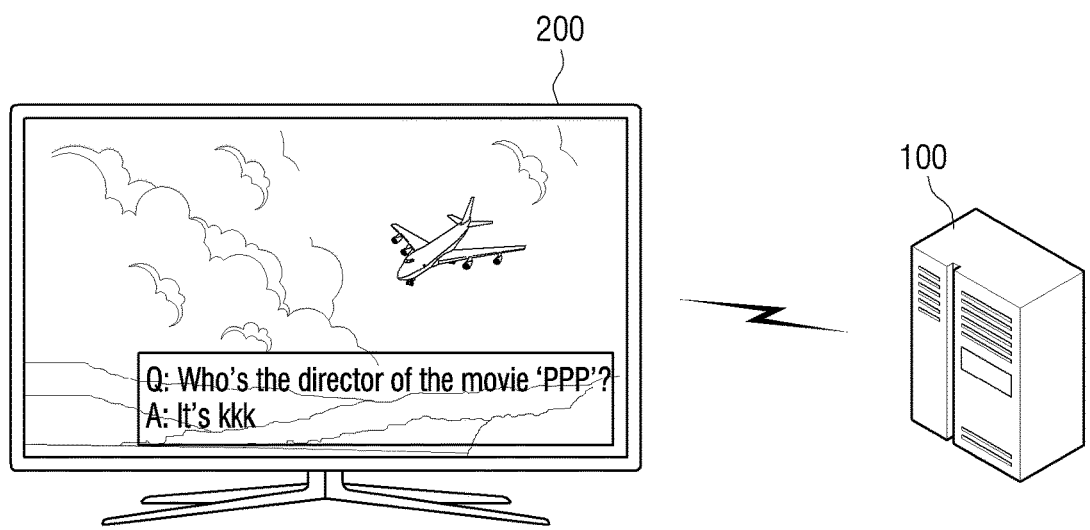
FIG. 1 is a diagram of an information providing system according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of one or more exemplary embodiments. Accordingly, it is apparent that one or more exemplary embodiments can be carried out without those specifically defined matters. Also, well-known functions or constructions are not described in detail since they would obscure the disclosure with unnecessary detail.

FIG. 1 illustrates an information providing system according to an exemplary embodiment. Referring to FIG. 1, the information providing system 10 may include a server 100 and a display apparatus 200.

The server 100 may include a question-answer database generated by using a question-answer template. Herein, the question-answer database (DB) may include a plurality of question-answer sets including questions related to content and corresponding answers to the questions. A plurality of questions-answer sets may be organized in a tree-based hierarchy. Building the question-answer database by using the question-answer template will be described more fully with reference to FIG. 3 below.

Meanwhile, the display apparatus 200 may acquire and transmit at least one of information corresponding to the currently displayed content and user information to the server 100. For example, the information corresponding to the currently displayed content may be information related to the content such as a title, a source, a broadcasting time, a cast, producers, a genre, and descriptions corresponding to the content that can be acquired through the content metadata such as an electronic program guide (EPG), although not limited thereto. The information corresponding to display state of the content such as whether or not the content display is finished or not, may be included. Further, the user information may include user preference information such as a content genre or favorite cast member that may be preferred by a user of the display apparatus 200, or use history information of a user such as viewing history information of content viewed by the user or searching record information of the user's searches with the display apparatus 200.

When at least one of the information is acquired from the information corresponding to the displayed content and the user information, the server 100 may extract the question-answer sets related to the content from the question-answer database based on the acquired information, and transmit the extracted question-answer sets to the display apparatus 200.

When the question-answer sets related to the content are received from the server 100, the display apparatus 200 may simultaneously display questions and answers of the received question-answer sets related to the content. FIG. 1 illustrates that the information corresponding to the movie 'PPP' is transmitted to the server 100 while the movie 'PPP' is being displayed on the display apparatus 200, and the server 100 extracts the question-answer sets related to 'PPP' including a question, "Who is the director of the movie 'PPP'?" and a corresponding answer to the question, "It's kkk" from the question-answer database, and transmits the question-answer sets to the display apparatus. The display apparatus 200 displays the question-answer sets related to the movie content "PPP."

According to an exemplary embodiment, even if the question-answer sets related to the content are received from the server 100, the display apparatus 200 may first display the questions related to the content, and next display the answers of the questions in response to inputting of a user command to request the answers of the questions.

In another exemplary embodiment, when the information corresponding to the currently displayed content and the user information of a user are acquired, the server 100 may extract only the questions related to the content from the question-answer database and transmit the extracted questions to the display apparatus 200. If the display apparatus 200 displays the received questions related to the content and transmits a request for the answers to the questions to the server 100 in response to a user command to request the answers, the server 100 may extract the answers to the questions from the question-answer database and transmit the answers to the display apparatus 200, and the display apparatus 200 may display the received answers.

Although FIG. 1 illustrates an embodiment in which the server 100 may acquire the information corresponding to the displayed content and the user information from the display apparatus 200, exemplary embodiment may not be limited thereto. In another example, corresponding information may be acquired from another server which manages information corresponding to the displayed content on the display apparatus 200 and the user information of a user. Although the display apparatus 200 may be smart TV, this is merely a non-limiting example. Accordingly, the display apparatus may be implemented as one of various display apparatuses such as, as non-limiting examples, a smart phone, a tablet personal computer (PC), a laptop PC, and a desktop PC.

Figure 2:
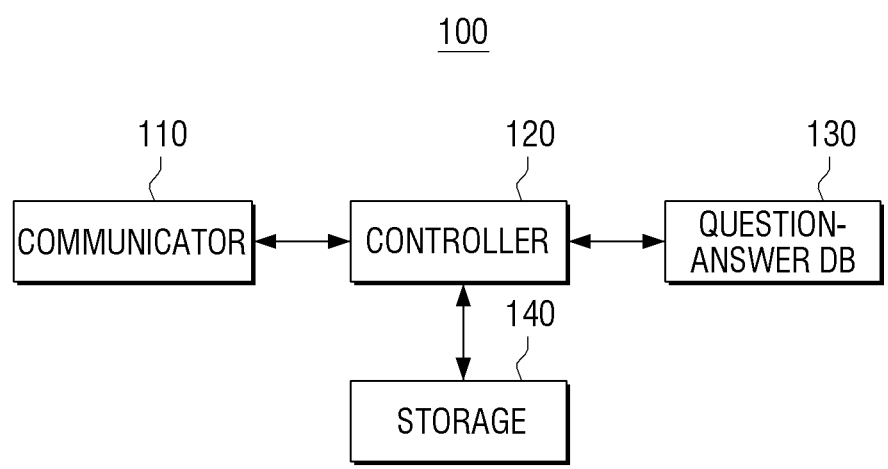
FIG. 2 is a block diagram of a server according to an exemplary embodiment.

FIG. 2 is a block diagram of the server according to an exemplary embodiment. Referring to FIG. 2, the server 100 may include a communicator 110, i.e., a transceiver, a controller 120, and the question-answer DB (database) 130.

The communicator 110 may perform communication with various external devices. Specifically, the communicator 110 may acquire various pieces of information from various sources while being connected to a network such as the Internet through wired or wireless networks.

Specifically, the communicator 110 may acquire at least one of the information corresponding to the displayed content and the user information from the display apparatus 200 or another server managing the information. Further, the communicator 100 may transmit the extracted questions and corresponding answers from the question-answer database to the display apparatus 200. Further, the communicator 110 may acquire the information related to various content from various sources in order to build the question-answer database, as described below.

For the above, the communicator 110 may include various communication cards and modules such as a wired local area network (LAN) card and a wireless LAN card.

The question-answer DB 130 may include a plurality of the question-answer sets including the questions related to the content, and corresponding answers to the questions. Herein, the question-answer DB 130 may be generated by using the question-answer template, a further include the question-answer sets generated based on the documents acquired from the external sources, such as a web page. Meanwhile, the question-answer DB 130 may include a plurality of the question-answer sets related to a plurality of content. A plurality of the question-answer sets may have a tree-based hierarchical structure.

A method in which the server 100 builds the question-answer database according to an exemplary embodiment will be described with reference to FIGS. 3 to 6.

Figure 3:
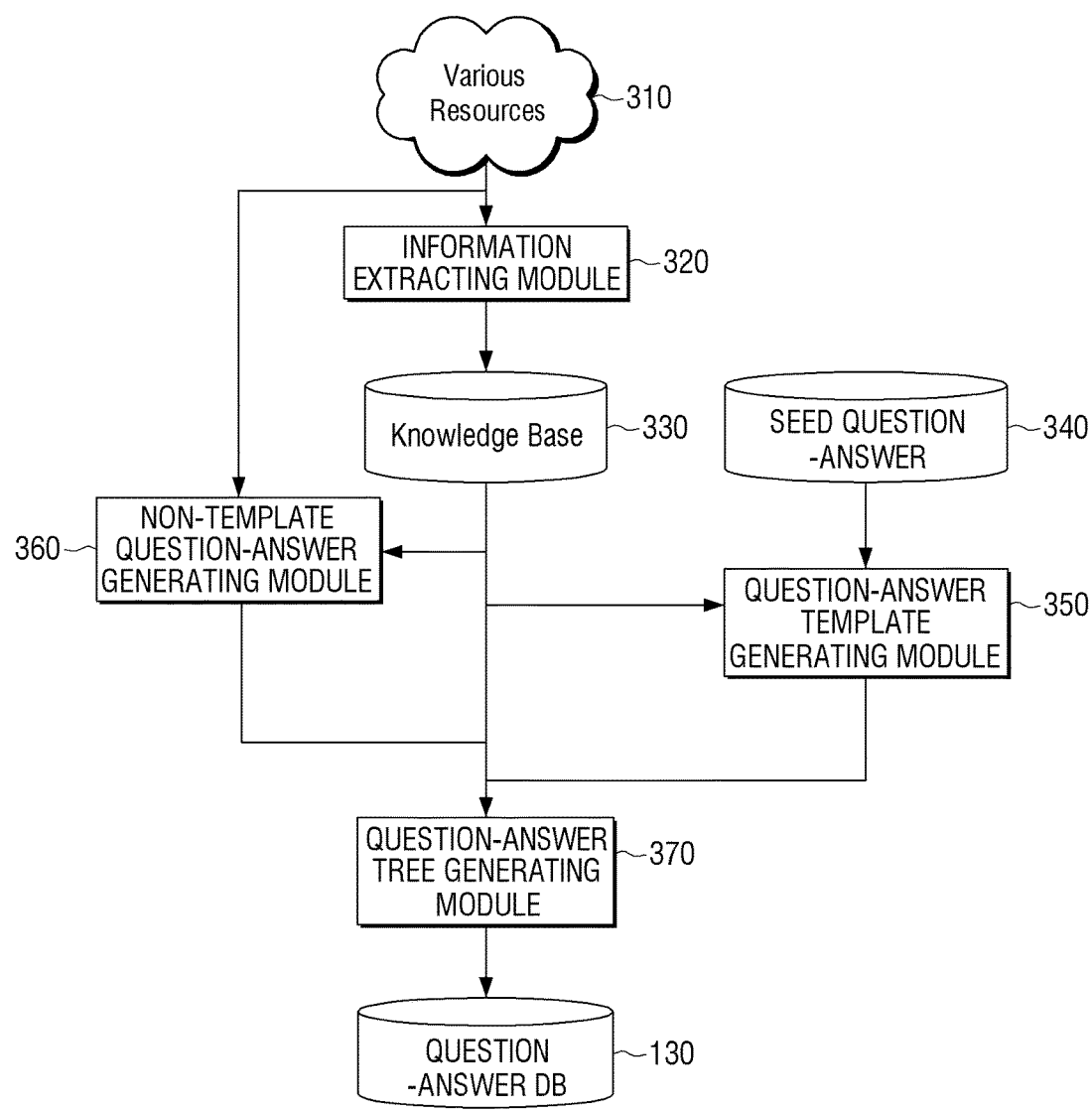
FIG. 3 is a diagram explaining a process of generating a question-answer database according to an exemplary embodiment.

FIG. 3 illustrates the method in which the server 100 builds the question-answer DB 130 according to an exemplary embodiment. Referring to FIG. 3, an information extracting module 320, i.e., an information extractor, may extract information corresponding to various content from various sources 310, and build a knowledge base 330. Specifically, the information extracting module 320 may build the knowledge base 330 by acquiring metadata information corresponding to the content related to subjects on which a user of the server 100 is trying to build the question-answer DB 130.

For example, when a user of the server 100 is trying to build the question-answer DB 130 related to a movie, the information extracting module 320 may build the knowledge base 330 corresponding to the content by acquiring the metadata information corresponding to various content related to the movie from web and content providers. The knowledge base 330 may arrange the information in a table format which matches various pieces of information corresponding to the content acquired from the metadata per item. For example, the information extracting module 320 may build the knowledge base 330 by extracting the information in the table format which matches the information corresponding to the content such as 'content genre: movie,' 'title of content: PPP,' and 'title of content-title of person responsible for content producing-name: PPP-director-kkk,' for items from the metadata corresponding to the content of the movie, 'PPP.'

Meanwhile, a question-answer template generating module 350 may generate the question-answer template by extracting a plurality of keywords from the seed questions and the seed answers stored in a storage 140 and analyzing relationship between a plurality of the extracted keywords.

Specifically, the seed questions and the seed answers may be previously created by a user of the server 100 corresponding to the subjects for the question-answer DB 130, and stored in the storage 140. Thereby, the question-answer template generating module 350 may extract a plurality of keywords by acquiring the seed questions and answers from the storage 140, and generate the question-answer template by analyzing relationship between a plurality of the extracted keywords.

Figure 4B:
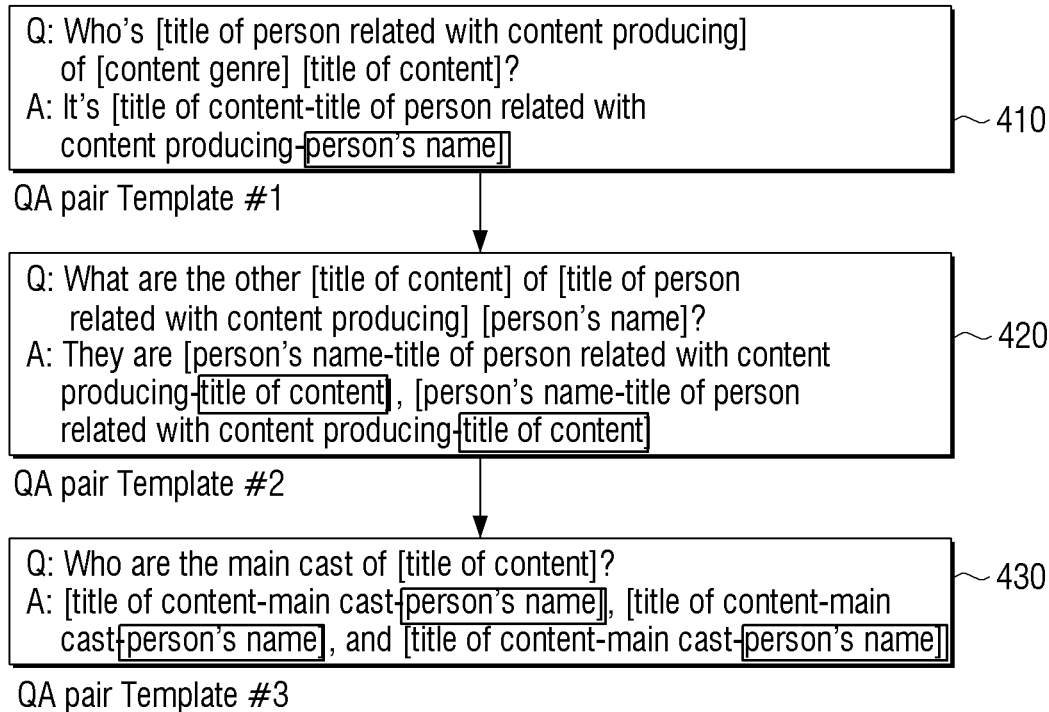

FIG. 4A illustrates an exemplary embodiment of the seed questions and corresponding seed answers and FIG. 4B illustrates an exemplary embodiment of the question-answer template generated from the seed questions and answers.

Referring to FIG. 4A, the seed questions and answers may include three levels of questions and corresponding answers. A first seed question at the first level is "who is the director of the movie, 'PPP'?" and the corresponding answer to the question is "kkk" Further, a second seed question at the second level is "what are other movies of the director, kkk?" and the corresponding answer is "YY and ZZZ." A third seed question at the third level is "who are the main cast of YY?" and corresponding answer is "bbb, ccc, and ddd."

When the seed questions and answers 340 are acquired, the question-answer template generating module 350 may extract the keywords such as "movie," "PPP," "director," and "kkk" while excluding other words from the first seed question and answer at the first level. The question-answer template generating module 350 may confirm which items of the information respectively correspond to the keywords through the information in the table format stored in the knowledge base 330. Thus, the question-answer template generating module 350 may generate the question template such as "who is [title of person responsible for content producing] of [content genre] [title of content]?" as indicated by template #1 410 of FIG. 4B. Further, the question-answer template generating module 350 may generate the answer template such as, "It's [title of content-title of person responsible for content producing-person's name]" from the keywords of the seed answer of the first level. The question-answer template generating module 350 may generate the question-answer template by using the seed questions and answers at the second and the third levels according to the above method.

The second seed question in FIG. 4A may be generated by using "kkk," which is a keyword of the first seed answer. Further, the third seed question may be generated using "YY," which is a keyword of the second seed answer. Therefore, the question-answer template generating module 350 may confirm upper and lower relationship at each level of the seed questions and answers, and generate the hierarchical question-answer template through the confirmed relations.

Although the above exemplary embodiment describes generating the question-answer template having three levels, this is merely an example, and the hierarchy of the question-answer template is not limited thereto. For example, the hierarchy may have two levels of the question-answer sets or four or more levels.

The knowledge base 330 may store the information corresponding to various content related to the movie in which a user of the server 100 is trying to build the question-answer DB 130 in the table format matching the information on an item-by-item basis. Thus, a question-answer tree generating module 370 of FIG. 3 may generate a plurality of the question-answer sets corresponding to various movie content having the hierarchical tree-based structure by applying the information stored in the knowledge base 330 to the question-answer template generated by the question-answer template generating module 350.

Figure 6:
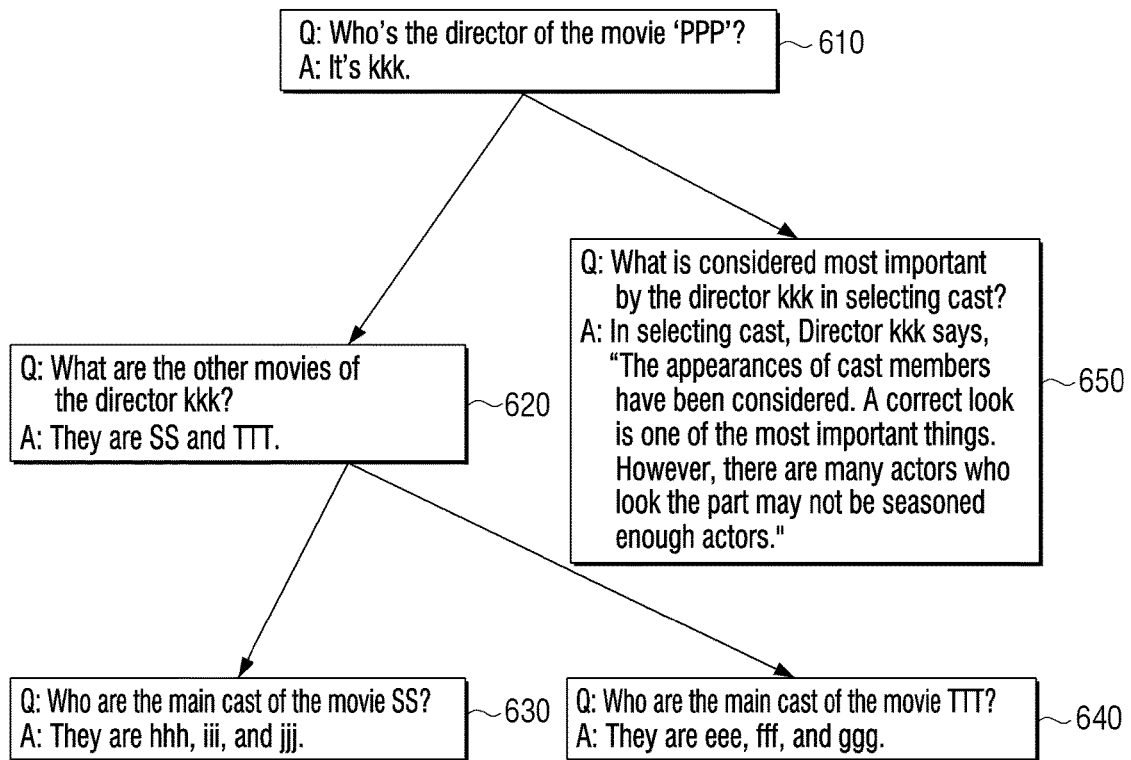
FIG. 6 illustrates a structure of the question-answer database according to an exemplary embodiment.

The question-answer tree of FIG. 6 may be generated using the question-answer template of FIG. 4B. As shown in 610 of FIG. 6, "[title of content-title of person responsible for content producing-person's name]" in 410 of FIG. 4B may be replaced by "kkk" corresponding to the name of the producer. Similarly, in 620 and 630 of FIG. 6, the 'SS' and 'TTT' corresponding to the title of content replace "[person's name-title of person related with content producing-title of content]" and 'hhh,' 'iii,' 'jjj' 'eee,' 'fff,' and 'ggg' corresponding to the name of cast members replace "[title of content-main cast-person's name]."

According to another exemplary embodiment, the question-answer DB 130 may further include the question-answer set including questions generated based on the documents acquired from external web pages and the answers generated corresponding to the generated questions.

Specifically, as illustrated in FIG. 3, a non-template question-answer generating module 360 may acquire documents from various sources 310, specifically, from external web pages, and generate question-answer sets based on the acquired documents. Thus, the non-template question-answer generating module 360 may select and generate sentences to be including the question-answer sets as answers from the acquired documents, and generate the question-answer sets by generating questions correspondingly to the generated answers.

FIG. 5 illustrates an embodiment of the generated question-answer sets based on the acquired documents from web pages. Referring to FIG. 5, the non-template question-answer generating module 360 may acquire various documents including the word, 'kkk,' from web pages with the keyword, 'kkk,' and select the sentence, "In selecting cast, Director kkk says that the appearances of cast members have been considered. A correct look is one of the most important things. However, there are many actors who look the part may not be seasoned enough actors," as answers. In this case, the standard to acquire documents or the standard to select sentences from the acquired documents by the non-template question-answer generating module 360 may be subjects related to the question-answer DB 130 which a user is trying to build. For example, a specific keyword may be input to the non-template question-answer generating module 360 by a manager of the server 100, or automatically acquired or selected according to predefined rules or statistical methods.

When answers are selected, the non-template question-answer generating module 360 may generate the question-answer sets by generating questions corresponding to the selected answers and matching with the answers. Herein, corresponding questions to the answers may be directly input and written by a user of the server 100 while viewing the selected answers, or automatically connected with the answers according to predefined rules or statistical methods from the storage 140 storing the other questions. Referring to the example of FIG. 5, the question-answer sets may be generated by matching the questions corresponding to the selected answers in the document, such as "what is considered most important by the director kkk in selecting the cast?"

Therefore, the non-template question-answer generating module 360 may generate the question-answer sets using the format of the information, which is different from the format of the question-answer template, e.g., the information in the sentence format included in the documents such as commentaries of a specific person, news articles corresponding to a specific person's episode, and reviews on a specific movie.

Referring back to FIG. 3, the non-template question-answer generating module 360 may add indexes in the format of the information stored in the knowledge base 330 to the generated question-answer sets. For example, the non-template question-answer generating module 360 may add an index such as 'title of content-title of person responsible for content producing-name: PPP-director-kkk' to the question-answer sets generated in the example of FIG. 5.

Thereby, a question-answer tree generating module 370 may add the question-answer sets matched with indexes and generated by the non-template question-answer generating module 360 to the question-answer sets having the hierarchical tree-based structure generated with the question-answer template, and build the question-answer DB 130 having the hierarchical tree-based structure as in the example of FIG. 6.

Thus, because the index of 'title of content-title of person responsible for content producing-name: PPP-director-kkk' may be added to the generated question-answer sets, the question-answer set 650 of FIG. 6 generated by the non-template question-answer generating module 360 may be added under of the question-answer set 610 including 'kick' as an answers.

A plurality of the question-answer sets having the hierarchical tree-based structure may be generated forming the question-answer DB 130. A plurality of the generated question-answer sets having the hierarchical tree-based structure may constitute a question-answer forest.

The controller 120 of the server 100 may include the information extracting module 320, the question-answer template generating module 350, the non-template question-answer generating module 360, and the question-answer tree generating module 370 described above.

The controller 120 may control general operations of the server 100. The controller 120 may acquire at least one of the information corresponding to the displayed content on the display apparatus 200 and the user information of a user of the display apparatus 200. Specifically, when the display apparatus 200 acquires and transmits at least one of the information corresponding to the displayed content and the user information, the controller 120 may receive and acquire the information corresponding to the displayed content on the display apparatus 200 and the user information through the communicator 110.

The controller 120 may receive and acquire the information corresponding to the content and the user information a server which manages the information corresponding to the content and the user information.

The controller 120 may receive the information corresponding to the content and the user information from the display apparatus 200 or the as server described above, and store the information in the storage 140. When the questions and the answers to the questions are extracted from the question-answer DB 130, the controller 120 may acquire the information corresponding to the content and the user information from the storage 140.

The controller 120 may control the communicator 110 to extract the questions related to the content from the question-answer DB 130 based on at least one of the information corresponding to the displayed content and the user information, and to transmit the extracted questions to the display apparatus. Specifically, as described above with reference to FIG. 1, the acquired information corresponding to the content may include at least one of keywords related to the content and the information corresponding to the display state of the content, and the user information may include at least one of the user preference information and use history information.

Therefore, the controller 120 may select paths in which the questions are extracted from a plurality of the question-answer sets having the hierarchical tree-based structure stored in the question-answer DB 130 by using at least one of the information corresponding to the content and the user information, and extract the questions according to the selected paths.

One or more of the information extracting module 320, question-answer template generating module 350, non-template question-answer generating module 360, and question-answer tree generating module 370 may be a functional unit of the server 100, and may be hardware, software, or a combination of hardware and software, as would be understood by one of ordinary skill.

Figure 7:
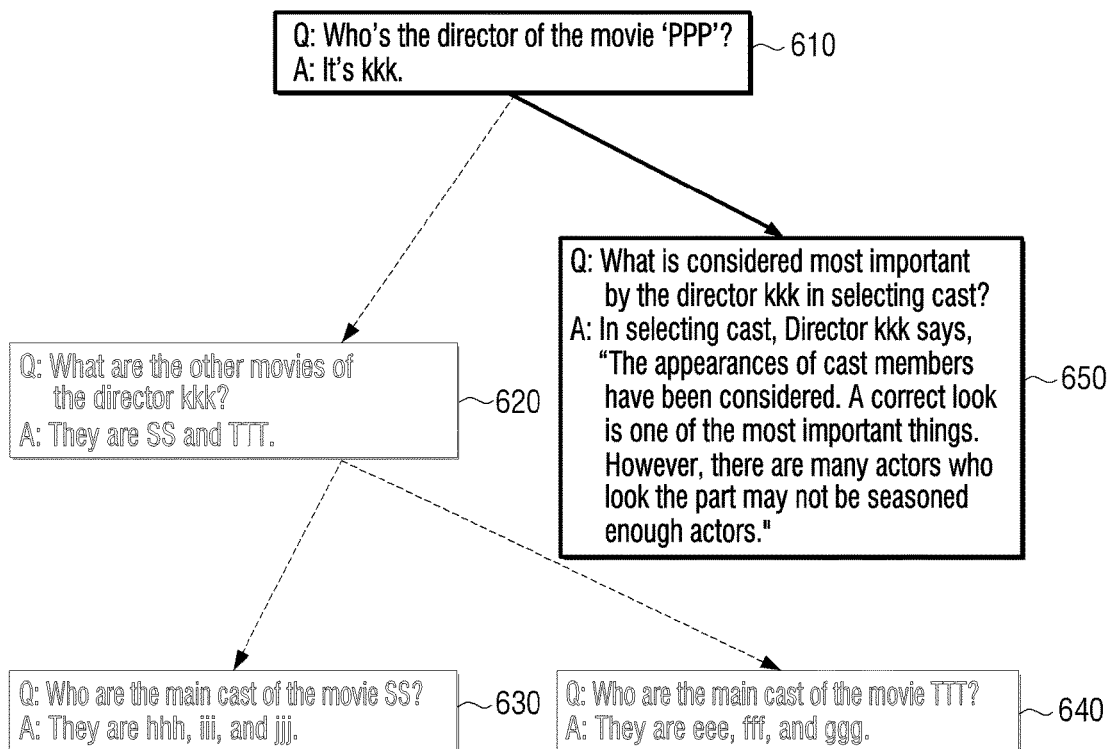
FIGS. 7 and 8 illustrate paths in which question-answer sets are selected from the question-answer database according to an exemplary embodiment.
Figure 8:
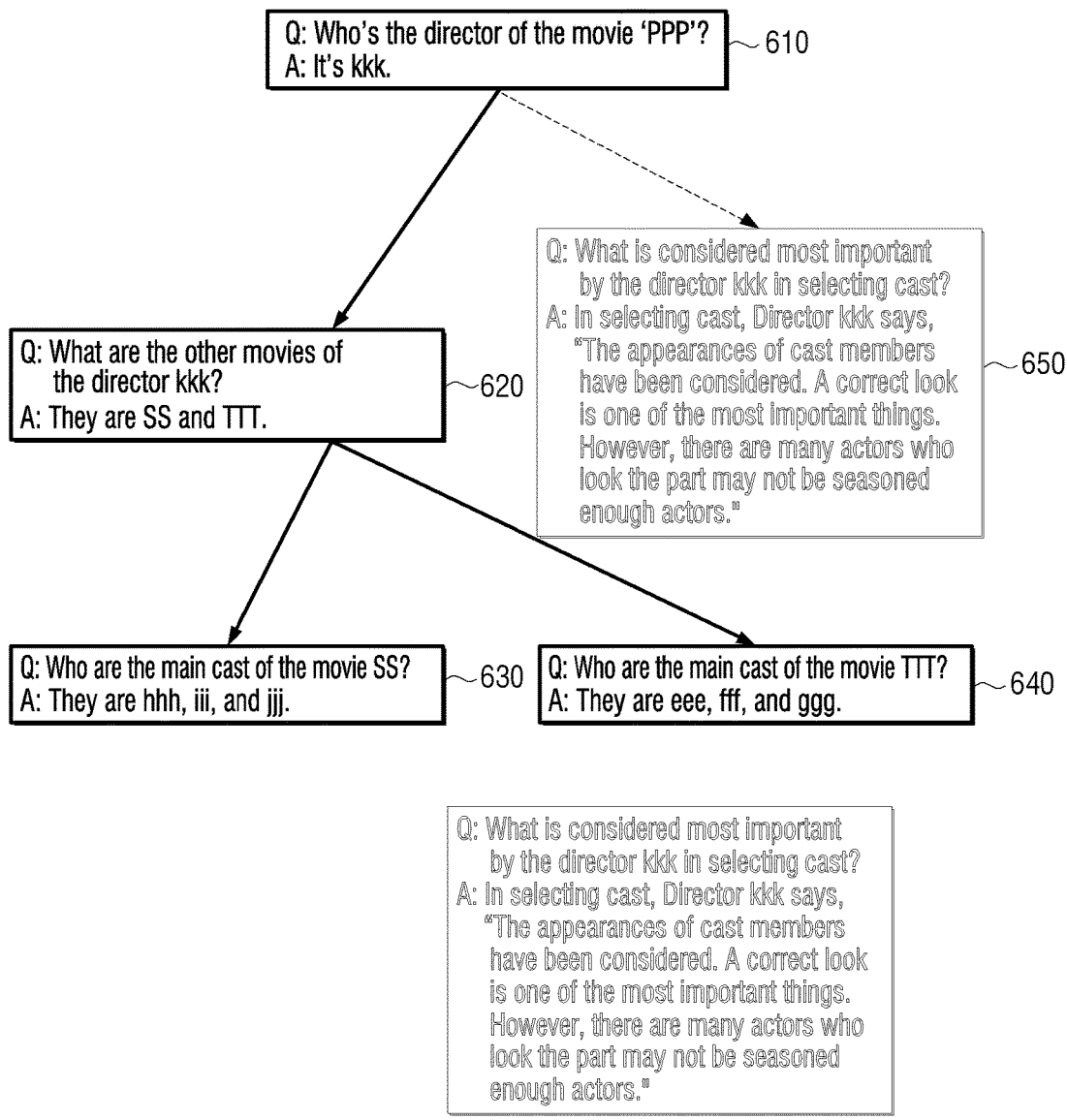

FIGS. 7 and 8 are diagrams illustrating paths in which the question-answer sets are selected from the question-answer database according to an embodiment.

For example, when the display apparatus 200 displays the interview with the director 'kkk' and the cast at the entertainment program corresponding to the movie 'PPP,' the display apparatus 200 may acquire the keywords corresponding to the content such as 'PPP,' 'Director-kkk,' and 'interview' and the information corresponding to the fact that the interview is currently displayed, i.e., aired, and transmit the acquired result to the server 100. In this case, the controller 120 may extract the questions following to the paths indicated by drawing reference numerals, 610 and 650 from a plurality of the question-answer sets having the hierarchical tree-based structure as illustrated in FIG. 7 based on the acquired keywords and the information corresponding to the display state of the content through the communicator 110. The above process may be used when the content is still displayed and the questions of the displayed content is determined to be more appealing to a user because it contains the interview of the director and the cast.

Meanwhile, for example, when the viewing of the movie 'PPP' is just finished in the display apparatus 200, the display apparatus 200 may acquire the information corresponding to the fact that displaying the keywords such as 'PPP' and the content is currently finished, and transmit the acquired result to the server 100. In this case, the controller 120 may extract the questions through the paths indicated by drawing reference numerals, 610, 620, 630, and 640 as illustrated in FIG. 8. Because the content is currently finished, users may be interest in the information corresponding to other movies produced by the director of the movie PPP or the information corresponding to the main cast of the director's other movies.

Meanwhile, the predefined rules stored in the storage 140 or the statistical methods may be used in the method in which the controller 120 selects the paths in which the questions are extracted from a plurality of the question-answer sets having the hierarchical tree-based structure based on the acquired information corresponding to the content and the acquired user information.

Therefore, the controller 120 may extract the questions according to the selected paths, and transmit the questions to the display apparatus 200 sequentially or consecutively. Alternatively, according to an exemplary embodiment, the controller 120 may extract all the question-answer sets on the selected paths at once, and transmit the question-answer sets to the display apparatus 200.

According to an exemplary embodiment, when a request for the answers to the questions is received from the display apparatus 200, the controller 120 may extract the answers to the questions from the question-answer DB 130, and transmit the answers to the display apparatus 200. Specifically, the controller 120 may extract the questions from the question-answer DB 130, and transmit the questions to the display apparatus 200. Thereafter, when a request for the answers to the questions is received from the display apparatus 200, the controller 120 may extract corresponding answers to the transmitted questions from the question-answer DB 130, and transmit the answers to the display apparatus 200.

According to an exemplary embodiment, when at least one of the information corresponding to the displayed content on the display apparatus 200 and the user information corresponding to a user of the display apparatus 200 is acquired, the controller 120 may extract the question-answer sets from the question-answer DB 130 based on at least one of the acquired information corresponding to the content and the acquired user information, and transmit the extracted question-answer sets to the display apparatus 200.

Figure 9:
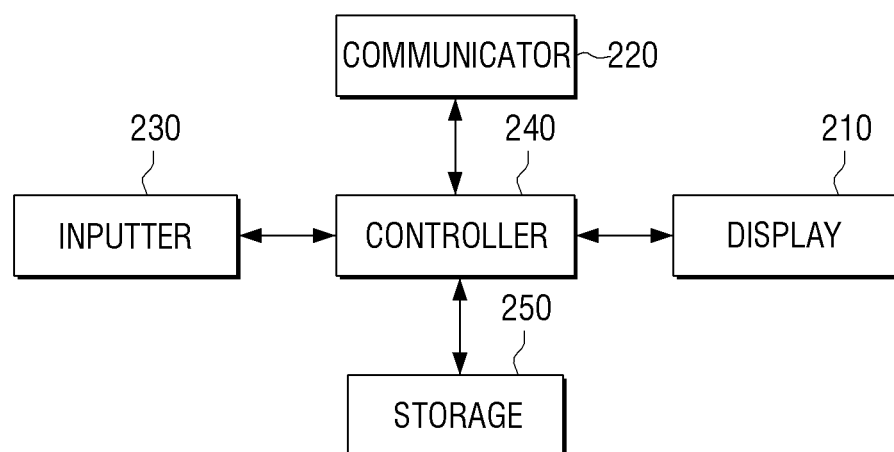
FIG. 9 is a block diagram of a display apparatus according to an exemplary embodiment.

FIG. 9 is a block diagram of the display apparatus 200 according to an embodiment. Referring to FIG. 9, the display apparatus 200 may include a display 210, a communicator 220, i.e., a transceiver, an inputter 230, i.e., an input/output (I/O) unit, a receiver, or a user interface, a controller 240, and a storage 250.

The display 210 may display images of various content acquired from various sources. Further, the display 210 may display the questions related to the content and corresponding answers to the questions under the control of the controller 240. Further, the display 210 may display the questions and a UI (User Interface) to receive an input of user commands requesting the answers. The display 210 may be implemented in various formats, such as LCD (Liquid Crystal Display), OLED (Organic Light Emitting Diodes), and PDP (Plasma Display Panel).

The communicator 220 may perform communication with external devices through various types of wired and the wireless networks. Specifically, the communicator 220 may perform communication with the server 100 including a pre-generated question-answer DB by using the question-answer template. Specifically, the communicator 220 may transmit at least one of the information corresponding to the content and the user information and a request for the answers to the questions to the server 100 by being controlled by the controller 240, and receive the questions related to the content and corresponding answers to the questions from the server 100.

For the above, the communicator 220 may include various communication cards and modules such as a wired LAN card, a wireless LAN card, a Bluetooth module, an NFC (Near Field Communication) module, and a wireless communication module. The wireless communication module may perform communication according to various communication standards such as IEEE, Zigbee, 3G ($3^{rd}$ Generation), 3GPP ($3^{rd}$ Generation Partnership Project), and LTE (Long Term Evolution).

The inputter 230 may receive an input of user commands to control the display apparatus 200. Specifically, the inputter 230 may receive a user command to request the answers to the displayed questions on the display 210. Further, the inputter 230 may receive a user command to request a next question. The inputter 230 may be implemented in various formats, such as a touch screen, a remote controller, a keyboard, a soft keyboard, a pointer, a mouse, and a button.

The storage 250 may store various programs and data necessary for the operation of the display apparatus 200. The storage 250 may store the information corresponding to the content and the user information acquired by the controller 240, and the question-answer sets acquired from the server 100.

The controller 240 may control a general operation of the display apparatus 200. The controller 240 may acquire at least one of the information corresponding to the displayed content and the user information. For example, the controller 240 may acquire various pieces of information corresponding to the displayed content by using the metadata information corresponding to the currently displayed content, and determine whether the content is currently displayed by comparing the information corresponding to a playback time, start time, or finish time of the content with the current time. Further, the controller 240 may acquire the user information by extracting viewing record information of a user's content viewing history or the user preference information of a user which are previously stored in the storage 250. However, these are merely examples, and a method in which the controller 240 acquires the information corresponding to the content and the user information should not be considered limited thereto.

Meanwhile, the controller 240 may acquire the questions related to the content based on the acquired information corresponding to the content and the acquired user information. Specifically, the controller 240 may transmit the acquired information corresponding to the content and the acquired user information to the server 100. When the questions related to the content are extracted and transmitted from the server 100, the controller 240 may acquire the questions related to the content by controlling the communicator 220 to receive the questions, and display the acquired questions related to the content on the display 210.

Further, in response to receiving a user command to request the answers to the displayed questions on the display 210 through the inputter 230, the controller 240 may transmit the request for the answers to the questions to the server 100. When corresponding answers to the questions are extracted and transmitted from the server 100, the controller 240 may control the communicator 220 to receive the answers to the questions, and acquire the answers. Further, the controller 240 may display the acquired answers to the questions on the display 210.

According to another exemplary embodiment, when the controller 240 transmits the acquired information corresponding to the content and the user information to the server 100, the server 100 may extract and transmit the question-answer sets based on the information to the display apparatus 200. In this case, the display apparatus 200 may store the question-answer sets corresponding to the content received from the server 100 in the storage 250. The controller 240 may display the questions corresponding to the content, and, in response to receiving a user command to request the answers, the controller 240 may acquire and display the answers to the questions from the storage 250.

Figure 10:
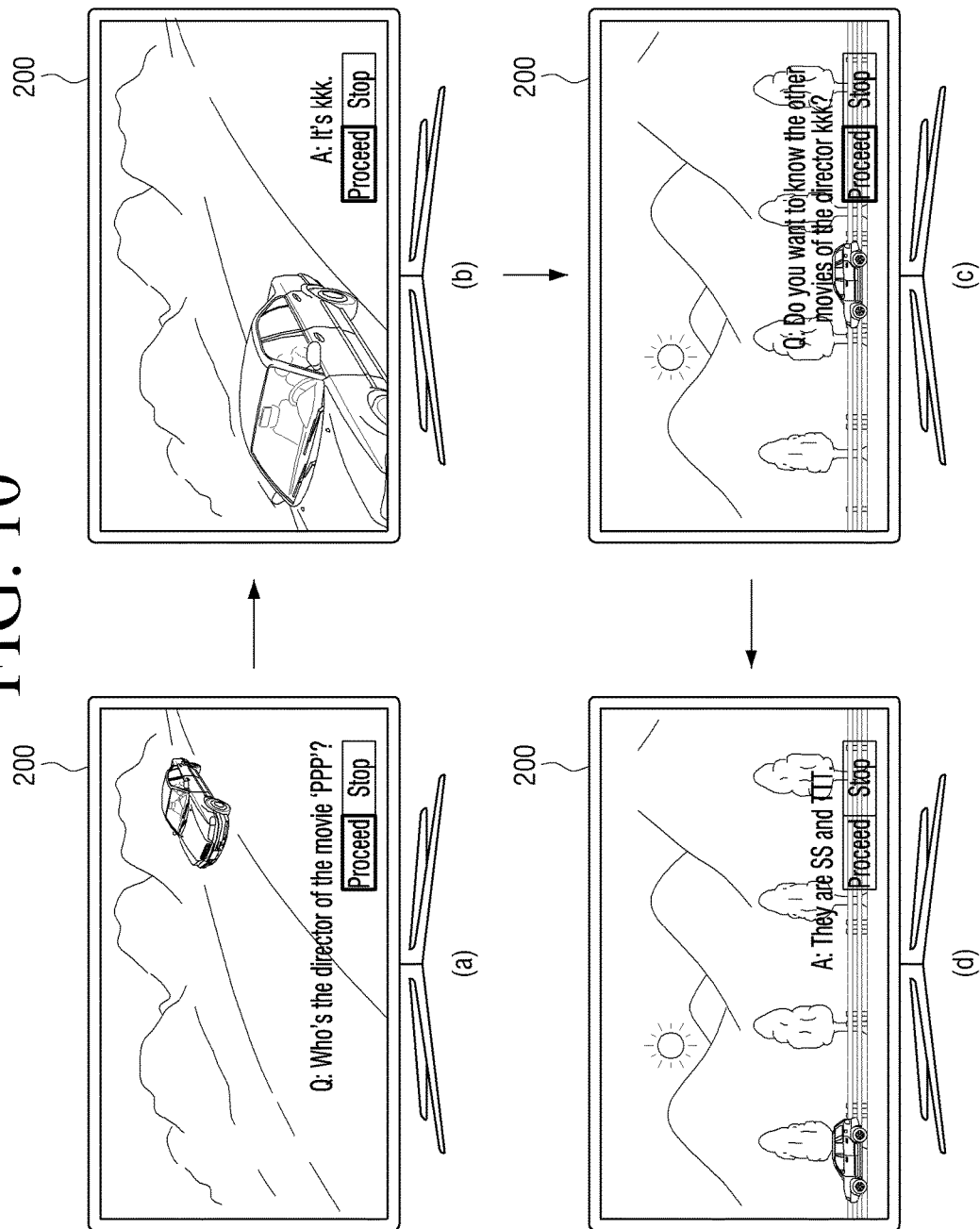
FIG. 10 is a diagram provided for questions and answers in the display apparatus according to an exemplary embodiment.

FIG. 10 is an exemplary diagram provided to describe displaying the questions and answers in the display apparatus 200 according to an exemplary embodiment. Specifically, FIG. 10 illustrates that the displaying of the movie 'PPP' is finishing. At this time, the controller 240 may acquire and transmit the information corresponding to 'PPP' and the user information to the server 100. When the server 100 extracts the questions related to 'PPP' and transmits the questions to the display apparatus 200, the controller 240 may receive and display the questions.

In (a) of FIG. 10 the question related to 'PPP,' "who is the director of the movie 'PPP'?", is displayed. A user may input a user command to request the answer to the question by selecting a UI to request the answer to the question, i.e., "proceed," in order to view the answer to the question.

The controller 240 may acquire the answer to the question from the server 100 or from the storage 250, and display the answer to the question such as "kkk," as illustrated in (b) of FIG. 10. A user may continuously select "proceed" to input a user command to request a next question.

The controller 240 may request a next question from the server 100. The server 100 may extract the next question on the selected path among a plurality of question-answer sets having the hierarchical tree-based structure, and transmit the question to the display apparatus 200. The controller 240 may receive the next question, and display the question such as "what are the other movies of the director kkk?," as shown in (c) of FIG. 10. Alternatively, when a plurality of the question-answer sets related to the content are received at a same time from the server 100 and stored in the storage 250, the controller 240 may acquire and display the next question requested by a user from the storage 250. A user may select "proceed" to request the answer to the question, and thereby, the answer to the question, such as "SS and TTT" may be displayed, as illustrated in (d) of FIG. 10.

Figure 11:
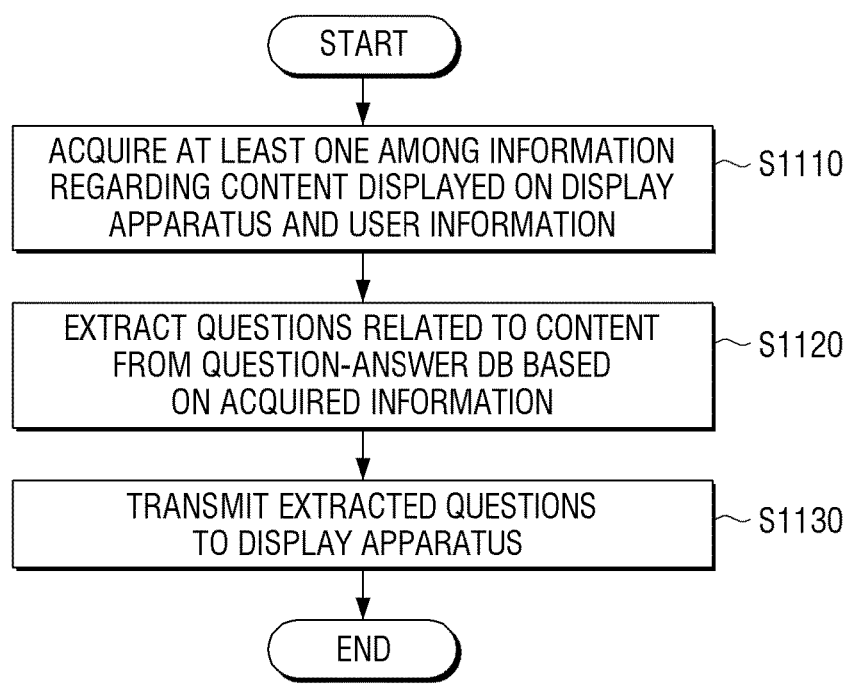
FIG. 11 is a flowchart of an information providing method of a server according to an exemplary embodiment.

FIG. 11 is a flowchart illustrating an information providing method of the server 100 according to an exemplary embodiment. Referring to FIG. 11, the server 100 may acquire at least one of the information corresponding to the displayed content on the display apparatus 200 and the user information of a user of the display apparatus 200 at S1110. The server 100 may extract the questions corresponding to the content from a question-answer database based on at least one of the acquired information corresponding to the displayed content and the acquired user information at S1120, and transmit the extracted questions related to the content to the display apparatus 200 at S1130. The question-answer database may be generated using the question-answer template. The question-answer database may be pre-generated.

The server 100 may generate the question-answer template by acquiring the seed questions and the seed answers, extracting a plurality of keywords from the seed questions and the seed answers, and analyzing relationship between a plurality of the extracted keywords. Further, the question-answer database may include the question-answer sets including the answers generated based on the acquired documents from external web pages and the questions generated correspondingly to the answers.

The question-answer database may include a plurality of the question-answer sets having the hierarchical tree-based structure.

Meanwhile, the information corresponding to the displayed content may include at least one of the keywords related to the content and the information corresponding to the display state of the content, and the user information may include at least one of user preference information and use history information. The server 100 may select the paths in which the questions are extracted from a plurality of the question-answer sets having the hierarchical tree-based structure by using at least one of the information corresponding to the content and the user information, and consecutively, sequentially, or simultaneously extract the questions according to the selected paths.

Further, when the request for the answers to the questions is received from the display apparatus 200, the server 100 may extract the answers to the questions from the question-answer database, and transmit the answers to the display apparatus.

Figure 12:
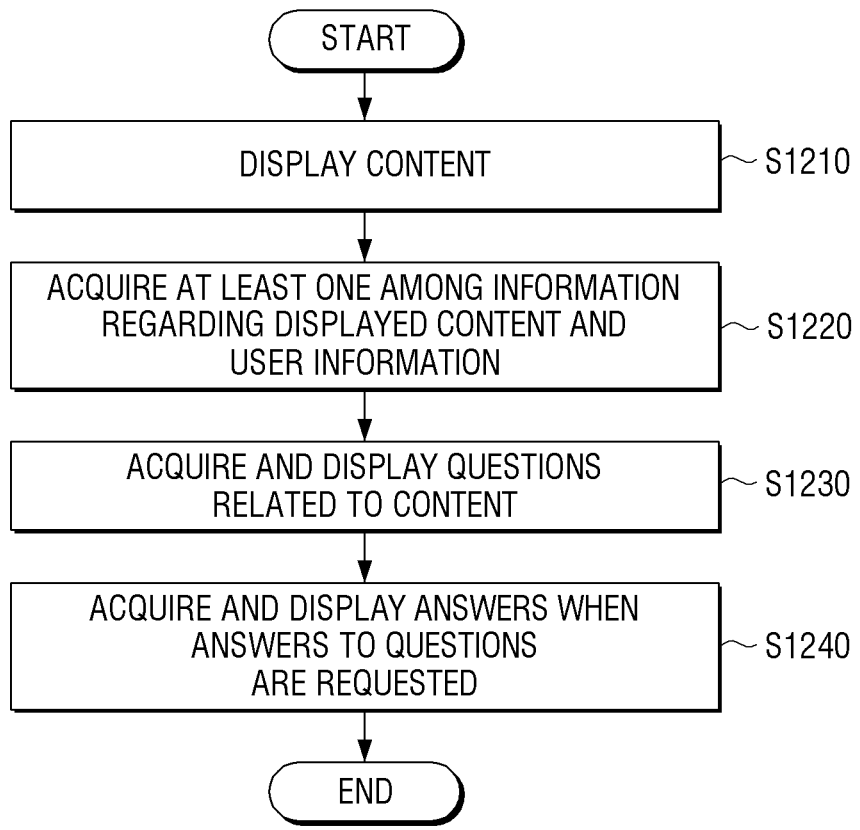
FIG. 12 is a flowchart of a controlling method of a display apparatus according to an exemplary embodiment.

FIG. 12 is a flowchart illustrating a controlling method of the display apparatus according to an exemplary embodiment. Referring to FIG. 12, the display apparatus 200 may display the content at S1210, and acquire at least one of the information corresponding to the displayed content and the user information at S1220. The display apparatus 200 may acquire and display the questions related to the content based on at least one of the acquired information corresponding to the content and the acquired user information at 1230. Specifically, the display apparatus 200 may transmit at least one of the acquired information corresponding to the content and the acquired user information to the server 100. Further, the display apparatus 200 may acquire and display the questions related to the content from the server 100. According to an exemplary embodiment, the display apparatus 200 may acquire and display the questions from the question-answer sets which are received from the server 100 and previously stored in the display apparatus 200.

Further, in response to receiving a user command to request the answers to the questions, the display apparatus 200 may acquire and display the answers to the questions at S1240. Specifically, the display apparatus 200 may transmit the request for the answers to the questions to the server 100 in response to inputting of a user command to request the answers to the questions. Therefore, the display apparatus 200 may acquire and display the answers to the questions from the server 100. According to an exemplary embodiment, the display apparatus 200 may acquire and display the answers to the questions from the question-answer sets which are received from the server 100 and previously stored.

FIG. 13 illustrates an operation of the server and the display apparatus according to an exemplary embodiment. Referring to FIG. 13, the server 100 may build the question-answer DB by using the question-answer template at S1300.

The display apparatus 200 may display the content at S1305, acquire at least one of the information corresponding to the displayed content and the user information at S1310, and transmit the acquired information to the server 100 at S1315.

The server 100 may extract the questions related to the content from the question-answer DB based on at least one of the information corresponding to the content and the user information which are received from the display apparatus 200 at S1320, and transmit the extracted result to the display apparatus at S1325.

The display apparatus 200 may display the received questions related to the content at S1330. In response to receiving a user command to request the answers to the questions at S1335, the display apparatus 200 may transmit the request for the answers to the questions to the server 100 at S1340.

The server 100 may extract the answers corresponding to the questions from the question-answer DB in response to the request for the answers at S1345, and transmit the answers to the display apparatus 200 at S1350. The display apparatus 200 may display the received answers to the questions at S1355.

FIG. 13 indicates that the questions related to the content and the answers to the questions may be separately extracted from the server 100 and transmitted to the display apparatus 200. However, as described above, the server 100 may extract the question-answer sets including the questions related to the content and the answers to the questions from the question-answer DB at once, and transmit the extracted results to the display apparatus 200. The display apparatus 200 may store the question-answer sets and display the questions and answers according to a user command.

According to the above various exemplary embodiments, the information related to the content may be provided while minimizing the interruption in viewing the content by a user, which can enrich the content viewing experience of a user.

The operation of the server and the controller in the display apparatus, the information providing method of the server and the controlling method of the display apparatus according to various exemplary embodiments may be embodied as a non-transitory computer readable recording medium storing a program to execute the various methods. Further, such non-transitory computer readable recording medium may be loaded and used on the server or the display apparatus.

A non-transitory computer readable recording medium may store and provide program codes to perform the information providing method of the server including acquiring at least one of the information corresponding to the displayed content on the display apparatus and the user information of a user of the display apparatus, extracting the questions related to the content from a generated question-answer DB based on at least one of the information corresponding to the displayed content and the user information, and transmitting the extracted questions to the display apparatus.

Further, a non-transitory computer readable recording medium may store and provide program codes to perform the controlling method of the display apparatus including displaying content, acquiring at least one of the information corresponding to the displayed content and the user information, acquiring and displaying the questions related to the content based on at least one of the information corresponding to the content and the user information, and acquiring and displaying the answers corresponding to the questions in response to receiving a user command to request the answers to the questions.

A non-transitory computer readable recording medium refers to a medium that stores data semi-permanently and can be read by devices, and not to a medium that stores data temporarily such as a register, a cache, or a memory. Specifically, the above various applications or programs may be stored and provided in non-transitory computer readable recording medium such as a compact disk (CD), a digital versatile disk (DVD), a hard disk, a Blu-ray disk, a universal serial bus (USB) memory stick, a memory card, or read-only memory (ROM).

Further, the foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims and their equivalents.

What is claimed is:

1. An information providing method of a server, comprising:
    obtaining content information corresponding to content displayed on a display apparatus and pre-stored user information of a user of the display apparatus, the pre-stored user information comprising at least one from among pre-stored user preference information of the user and pre-stored use history information of the user;
    obtaining at least one question related to the content displayed on the display apparatus from a question-answer database based on the obtained content information and the pre-stored user information, the question-answer database comprises a plurality of question-answer sets which are stored as a tree-based hierarchical structure;
    transmitting the obtained at least one question to the display apparatus; and based on a request for at least one answer to the transmitted at least one question being received from the display apparatus, obtaining the at least one answer from the question-answer database and transmitting the obtained at least one answer to the display apparatus, wherein the plurality of question-answer sets are generated by using at least one of question-answer template, the at least one of question-answer template is generated based on relationships between a plurality of keywords which are obtained from seed questions and seed answers, wherein the relationships between the plurality of keywords are obtained based on a knowledge base which is built by obtaining metadata information corresponding to a plurality of secondary multimedia contents related to a primary multimedia content, the plurality of secondary multimedia contents are obtained from an internet network and a plurality of content providers, wherein the content information comprises at least one of keywords related to the content and information corresponding to a display state of the content, wherein the pre-stored preference information of the user comprises at least one from among favorite content genre of the user and favorite cast member of the user and the pre-stored use history information of the user comprises at least one from among viewing history information of content viewed by the user and searching record information of searches made by the user, and wherein the obtaining the at least one question comprises:
 selecting a path in the hierarchical tree-based structure of the plurality of the question-answer sets based on the obtained content information and the obtained user information, and
 obtaining the at least one question corresponding to the question-answer sets of the selected path.

2. The information providing method of claim 1, further comprising:
 receiving a request for at least one answer to the at least one question from the display apparatus;
 obtaining the at least one answer from the question-answer database; and
 transmitting the obtained at least one answer to the display apparatus.

3. The information providing method of claim 1, wherein the question-answer database comprises at least one question-answer set comprising an answer generated based on documents obtained from external web pages and a question generated to correspond to the generated answer.

4. A server, comprising:
 a communicator configured to communicate with an external device;
 a question-answer database storing a plurality of question-answer sets corresponding to a hierarchical tree-based structure, the question-answer sets being generated based on a question-answer template; and
 a controller configured to:
 based on content information corresponding to content displayed on a display apparatus and pre-stored user information of a user of the display apparatus, being obtained through the communicator, obtain at least one question related to the content displayed on the display apparatus from the question-answer database based on the content information and the pre-stored user information, and to control the communicator to transmit the obtained at least one question to the display apparatus, wherein the pre-stored user information of the user of the display apparatus comprising at least one from among pre-stored user preference information of the user and pre-stored use history information of the user, and wherein the question-answer template is generated by obtaining a plurality of keywords from seed questions and seed answers based on a knowledge base built by obtaining metadata information corresponding to a plurality of secondary multimedia contents related to a primary multimedia content, the plurality of secondary multimedia contents are obtained from an internet network and a plurality of content providers, and analyzing relationships between the plurality of obtained keywords, wherein the content information comprises at least one of keywords related to the content and information corresponding to a display state of the multimedia content, wherein the pre-stored preference information of the user comprises at least one from among favorite content genre of the user and favorite cast member of the user and the pre-stored use history information of the user comprises at least one from among viewing history information of content viewed by the user and searching record information of searches made by the user, and wherein the controller is further configured to select a path of the hierarchical tree-based structure of the plurality of the question-answer sets by using the content information and the pre-stored user history information, and to obtain the at least one question corresponding to the question-answer sets of the selected path.

5. The server of claim 4, wherein the question-answer database comprises at least one of the question-answer set comprising an answer generated based on documents obtained from external web pages and a question generated to correspond to the generated answer.

6. A controlling method of a display apparatus, comprising:
 displaying content;
 obtaining content information corresponding to the displayed content on a display apparatus and pre-stored user information of a user of the display apparatus, the pre-stored user information comprising at least one from among pre-stored user preference information of the user and pre-stored use history information of the user;
 obtaining at least one question related to the content from a database based on the content information and the pre-stored user information, the database comprises a plurality of question-answer sets corresponding to a hierarchical tree-based structure;
 displaying the obtained at least one question;
 obtaining from the database, based on receiving a user command to request at least one answer to the displayed at least one question, the at least one answer; and
 displaying the obtained at least one answer, wherein the content information comprises at least one of keywords related to the content and information corresponding to a display state of the multimedia content, wherein the pre-stored preference information of the user comprises at least one from among favorite content genre of the user and favorite cast member of the user and the pre-stored use history information of the user comprises at least one from among viewing history information of content viewed by the user and searching record information of searches made by the user, and wherein the obtaining the at least one question comprises:
selecting a path in a hierarchical tree-based structure of the plurality of the question-answer sets based on the obtained content information and the obtained user information, and obtaining the at least one question corresponding to the question-answer sets of the selected path, transmitting the content information and the pre-stored user information to a server, the server comprising a question-answer database generated using a question-answer template, which is generated by obtaining a plurality of keywords from seed questions and seed answers based on a knowledge base built by obtaining metadata information corresponding to a plurality of secondary multimedia contents related to a primary content, wherein the plurality of secondary multimedia contents are obtained from an internet network and a plurality of content providers, and analyzing relationships between the plurality of obtained keywords.

7. The controlling method of claim 6, wherein
the obtaining the at least one question further comprises:
obtaining the at least one question related to the content from the server, and the obtaining the at least one answer comprises:
transmitting, based on receiving the user command to request the at least one answer to the obtained at least one question, a request for the at least one answer to the obtained at least one question to the server; and
obtaining the at least one answer corresponding to the at least one obtained question from the server,
wherein the obtained at least one question comprises a single question and wherein the user command comprises one of proceed to the at least one answer and stop the display of the single question.

8. A display apparatus, comprising:
a display configured to display content;
a receiver configured to receive a user command;
a controller configured to:
obtain at least one from among content information corresponding to the displayed content and pre-stored user information different from the user command to request a question received by the receiver,
obtain at least one question related to the content based on the obtained content information and the pre-stored obtained user information comprising at least one from among pre-stored user preference information of the user and pre-stored use history information of the user,
control the display to display the obtained at least one question,
obtain, based on the receiver receiving the user command to request at least one answer to the obtained at least one question, the at least one answer, and
control the display to display the obtained at least one answer; and
a communicator configured to communicate with a server, the server comprising a question-answer database generated using a question-answer template, which is generated by obtaining a plurality of keywords from seed questions and seed answers based on a knowledge base built by obtaining metadata information corresponding to a plurality of secondary multimedia contents related to a primary multimedia content, the plurality of secondary multimedia contents are obtained from an internet network and a plurality of content providers, and analyzing relationships between the plurality of obtained keywords, wherein the pre-stored preference information of the user comprises at least one from among favorite content genre of the user and favorite cast member of the user and the pre-stored use history information of the user comprises at least one from among viewing history information of content viewed by the user and searching record information of searches made by the user, wherein the question-answer database comprises a plurality of question-answer sets corresponding to a hierarchical tree-based structure, wherein the server is configured to obtain the at least one question by:
selecting a path in the hierarchical tree-based structure of the plurality of the question-answer sets based on the obtained content information and the obtained user information, and
obtaining the at least one question corresponding to the question-answer sets of the selected path.

9. The display apparatus of claim 8, wherein the controller is further configured to control the communicator to:
transmit, to the server, the obtained content information and the obtained pre-stored user information;
obtain the at least one question related to the content from the server;
transmit, based on the receiver receiving the user command to request at least one answer to the obtained at least one question, the request for the at least one answer to the obtained at least one question to the server; and
obtain the at least one answer corresponding to the obtained at least one question from the server.

10. An information providing system, comprising:
a display apparatus configured to display content; and
a server comprising a question-answer database generated using a question-answer template, the server being configured to, based on information corresponding to the content displayed on the display apparatus and pre-stored user information of a user of the display apparatus being obtained, obtain question-answer sets related to the content from the question-answer database based on the obtained content information and the obtained pre-stored user information, and transmit the obtained question-answer sets to the display apparatus, wherein the display apparatus is further configured to obtain the content information and the pre-stored user information, transmit the content information and the pre-stored user information to the server, and display the question-answer sets related to the content obtained from the server, wherein the pre-stored user information of a user of the display apparatus comprising at least one from among pre-stored user preference information of the user and pre-stored use history information of the user, wherein the obtained question-answer sets are stored in the server as a hierarchical tree-based structure, wherein the question-answer template is generated by obtaining a plurality of keywords from seed questions and seed answers based on a knowledge base built by obtaining metadata information corresponding to a plurality of secondary multimedia contents related to the content, which is a primary multimedia content, the plurality of secondary multimedia contents are obtained from an internet network and a plurality of content providers, and analyzing relationships between the plurality of obtained keywords, wherein the pre-stored preference information of the user comprises at least one from among favorite content genre of the user and favorite cast member of the user and the pre-stored use history information of the user comprises at least one from among viewing history information of content viewed by the user and searching record information of searches made by the user, and wherein the server is configured to obtain the at least one question by:
- selecting a path in the hierarchical tree-based structure of the plurality of the question-answer sets based on the obtained content information and the obtained user information, and
- obtaining the at least one question corresponding to the question-answer sets of the selected path.

11. A method of generating a question-answer database, the method comprising:
- building a knowledge base corresponding to a primary multimedia content based on metadata of a plurality of secondary multimedia contents related to the primary multimedia content, the plurality of secondary multimedia contents are obtained from an internet network and a plurality of content providers;
- obtaining a plurality of keywords from seed questions and seed answers based on the built knowledge base;
- generating a question-answer template, by analyzing relationship between the plurality of the obtained keywords through the knowledge base;
- generating a plurality of question-answer sets by using the question-answer template, and information stored in the knowledge base;
- storing the generated plurality of question-answer sets in a database in a tree-based hierarchical structure,
- obtaining content information corresponding to content displayed on a display apparatus and obtaining pre-stored user information of a user of the display apparatus, the pre-stored user information comprising at least one from among pre-stored user preference information of the user and pre-stored use history information of the user;
- obtaining at least one question related to the multimedia content from the database based on the content information and the obtained user information;
- transmitting the obtained at least one question to the display apparatus; and
- based on a request for at least one answer to the transmitted at least one question being received from the display apparatus, obtaining the at least one answer from the database and transmitting the obtained at least one answer to the display apparatus, wherein the content information comprises at least one of keywords related to the content and information corresponding to a display state of the multimedia content, wherein the pre-stored preference information of the user comprises at least one from among favorite content genre of the user and favorite cast member of the user and the pre-stored use history information of the user comprises at least one from among viewing history information of content viewed by the user and searching record information of searches made by the user, and wherein the obtaining the at least one question comprises:
- selecting a path in the hierarchical tree-based structure of the plurality of the question-answer sets based on the obtained content information and the obtained user information, and
- obtaining the at least one question corresponding to the question-answer sets of the selected path.

12. The method according to claim 11, wherein the building the knowledge base comprises:
- organizing the metadata in a table format matching information items related to the primary content,
- wherein the seed question and the seed answers comprise a plurality of levels of the seed questions and the seed answers, and
- wherein the generating the plurality of template question-answer sets comprises confirming an upper and a lower relationship at each level of the seed questions and the seed answers, and
- excluding of other words based on the built knowledge base by excluding keywords from an upper level from among the plurality of levels of the seed questions and the seed answers.

13. The method according to claim 11, further comprising:
- obtaining at least one document from at least one external source;
- selecting information contained in the obtained at least one document;
- generating at least one answer corresponding to the selected information;
- generating at least one question corresponding to the generated at least one answer,
- generating at least one non-template question-answer set based on the generated at least one answer and the corresponding generated at least one question;
- adding an index to each of the at least one non-template question-answer set; and
- storing the generated at least one non-template question-answer set in the database in the tree-based hierarchical structure with the plurality of template question-answer sets based on the added index.

* * * * *